Patented June 23, 1942

2,287,647

UNITED STATES PATENT OFFICE 2,287,647

MANUFACTURE OF INTERMEDIATES FOR DYESTUFFS

Harvey Irvin Stryker, Carneys Point, N. J., assignor to E. I. du Pont de Nemours & Company, Wilmington, Del., a corporation of Delaware No Drawing. Application May 22, 1941, Serial No. 394,653

5 Claims. (Cl. 260—570)

This invention relates to a method of manufacture of intermediates for dyestuffs of the triphenyl methane series, and more particularly to a method of manufacture of N:N'-tetraalkyl-4:4'-diaminobenzophenones and related compounds.

It is an object of this invention to provide an improved method for the manufacture of N:N'-tetraalkyl - 4:4' - diaminobenzophenones. Other important objects of this invention will appear as the description proceeds.

The practice of the art hitherto in the manufacture of N:N'-tetraalkyl - diamino - benzophenones is illustrated by the following process applied to the manufacture of Michler's ketone, i. e. the tetramethyl compound of the above series.

(a) Dimethyl aniline (4 mols) is treated with phosgene (1 mol) to form para-dimethylamino benzoyl chloride (1 mol).

(b) A condensing agent, such as anhydrous zinc chloride, is then added, and the mixture is heated to bring about reaction of the said benzoyl chloride with a second mol of dimethylaniline to form Michler's ketone. The reaction mixture, which now contains the condensing agent, two mols of dimethylaniline hydrochloride, the Michler's ketone, and some by-products formed, is then worked up to isolate the product and recover dimethylaniline.

Two general methods of working up the mixture have been used:

(a) The entire mass may be treated with an excess of aqueous sodium hydroxide to liberate the unreacted dimethylaniline, which is then recovered by steam distillation leaving the crude ketone behind, which may be recovered by filtration.

(b) The mass may be diluted with water, with or without the addition of a small amount of hydrochloric acid, and the crude ketone filtered off. After basification of the filtrate with calcium hydroxide, the dimethylaniline may then be recovered by steam distillation.

In either case the crude ketone was then purified either by crystallization from a suitable solvent such as alcohol or xylene, or by vacuum distillation or by careful treatment with aqueous hydrochloric acid.

The reason for the careful treatment in the mentioned purification with acid is the fact that Michler's ketone itself will form a soluble salt with hydrochloric acid as a result of which part of the ketone will be lost in the filtrates unless special care for the control of concentration, temperature, etc. is exercised in this step. Such careful control is burdensome and often unattainable in commercial manufacture on a large scale.

Now according to the present invention, Michler's ketone and the homologous ketones of this series may be readily separated from attendant impurities, without the requirement of any special skill or care, by treating the crude ketone with dilute phosphoric acid solution. It appears that the natural impurities attending N:N-tetraalkyl-diamino-benzophenones in their manufacture by the above process have a specially high solubility in dilute phosphoric acid (probably as a result of salt formation), while the ketones themselves do not form any substantial amounts of salt when treated with dilute phosphoric acid under the conditions of this invention.

Accordingly, my improved process consists in purifying tetraalkyl-diamino-benzophenones by treating them with aqueous phosphoric acid of a concentration of about 3 to 10%, whereby the impurities are washed out and the desired product is obtained in a state of high purity and without substantial loss.

Without limiting my invention, the following examples will illustrate my preferred mode of operation. Parts mentioned are by weight.

Example 1

Prepare Michler's ketone as above described, from 2800 parts of dimethylaniline and 570 parts of phosgene, using 250 parts of zinc chloride to effect the condensation. Discharge the reaction mass into 3000 parts of water and add aqueous sodium hydroxide until the mass is alkaline to Clayton Yellow paper. Steam distil until dimethylaniline no longer comes off. After separation from the water, 1370 to 1430 parts of dimethylaniline will be thus recovered.

The crude ketone will remain in the form of pellets in the flasks from which the distillation was made. While still hot, pour the contents of the flask onto a 60 mesh wire screen and wash freely with cold water to remove adhering zinc hydroxide and sodium hydroxide.

Add the pellets from the screen to a solution of 500 parts of 65% phosphoric acid in 5000 parts of water. Agitate, heat to 85 to 90° C. and hold at this temperature for 2 hours. Filter, discarding the filtrate which contains the impurities. Wash the cake with cold water to displace the mother liquor.

Repeat the treatment of the filter cake as above with another 500 parts 65% phosphoric acid and 5000 parts of water. Wash with cold water until washings are no longer acid. Dry the Michler's ketone at 80 to 90° C. A product of excellent quality is thus obtained, having a M. P. at 173.8–174.2° C.

Example 2

Diethyl-aniline and phosgene are reacted together in the above manner, in the presence of zinc chloride, to give a mass containing tetraethyl-diamino-benzophenone and diethyl-aniline-hydrochloride. The latter is removed by basification and steam-distilling as in the above example. The remaining crude ketone is then treated as follows:

Add 150 parts of the crude ketone to 1000 parts of water containing 50 parts of 65% phosphoric acid at 90 to 95° C. Agitate 1 hour. Cool to 40 to 45° C. with continuous agitation. Filter and wash with cold water. Repeat the treatment with phosphoric acid. Wash with cold water until the washings are no longer acid. Dry the tetraethyl-diaminobenzophenone in vacuo at 70 to 75° C. The product obtained is of high quality and has a freezing point of 91.9° C.

It will be clear that the above examples are merely illustrative and that the details of procedure may be varied without departing from the spirit of this invention. Thus, the temperature at which the phosphoric acid treatment is given may be varied from room temperature up to the boiling point of the mixture. Generally, it is best to work in the range 80° C. to 95° C.

The concentration of aqueous phosphoric acid used may be varied over a wide range, though for cost reasons should be kept as low as possible. Best results have been obtained in the 3 to 7% range, although good results have also been obtained at 15% concentration.

The quantity of phosphoric acid used may also be varied over a wide range. Best results have been obtained using from 0.1 to 0.5 part of phosphoric acid per part of tetraalkyldiamino benzophenone.

The number of treatments given may be varied at will. Generally, the preferred procedure is to use two treatments, though in some cases one will suffice.

For obvious reasons of manipulation, it is preferred to cool the purification charge below the melting point of the ketone used and filter off the product. This is not essential however, since the product may be separated in the known manner as a liquid above its melting point.

Although illustrated specifically with reference to tetramethyl- and tetraethyl-diamino-benzophenones, my improved process may be applied with equal success to the benzophenones obtained from dibutyl-aniline, and other di-alkyl anilines as well as the monoalkyl-ortho-toluidines, such as monoethyl-ortho-toluidine, which behave like tertiary amines in the phosgene reaction under discussion.

The superior quality of the obtained ketone as indicated in the above examples is reflected by a definite improvement in the dyestuffs of the Victoria Blue series manufactured therefrom. For example, Victoria Blue B Base prepared from Michler's ketone and purified according to this invention is greener, much brighter, and about 15% stronger than the product at present sold in the trade. Similar improvements are observed in Victoria Blue R and Victoria Blue B Conc.

Also, when working according to this invention, there is an increase in yield of about 5 to 10% on Michler's ketone, due to diminished loss of the same in the purification step.

This invention also offers a much simpler process for large scale operation inasmuch as it does not require high skill and expert judgment for correct results.

I claim:

1. In the manufacture of a diamino-diaryl-ketone by reacting a compound selected from the group consisting of the dialkyl anilines and the monoalkyl-ortho toluidines with phosgene followed by separation of the by-product hydrochloride of the substituted arylamine, the improvement which consists of washing the crude diamino-diaryl-ketone with dilute aqueous phosphoric acid.

2. The process of recovering a tetraalkyl-diamino-benzophenone from the crude reaction product obtained by reacting a di-alkyl-aniline with phosgene followed by separation of the by-product dialkyl-amine-hydrochloride, which comprises washing the crude product with aqueous phosphoric acid of a concentration less than 15%.

3. The process of recovering a tetraalkyl-diamino-benzophenone from the crude reaction product obtained by condensing a dialkyl-aniline with phosgene in the presence of zinc chloride and removing the by-product dialkyl-aniline-hydrochloride, which comprises washing the crude product with an aqueous solution of phosphoric acid, of 3 to 10% concentration and at a temperature about 80 to 95° C.

4. The process of recovering tetramethyl-diamino-benzophenone from the crude reaction product obtained by condensing dimethyl-aniline with phosgene in the presence of zinc chloride followed by removal of the by-product dimethyl-aniline-hydrochloride, which comprises washing said crude product with aqueous phosphoric acid of 3 to 7% concentration and at a temperature of 80 to 95° C.

5. The process of recovering tetraethyl-diamino-benzophenone from the crude reaction product obtained by condensing diethyl-aniline with phosgene in the presence of zinc chloride followed by removal of the by-product diethyl-aniline-hydrochloride, which comprises washing said crude product with aqueous phosphoric acid of 3 to 7% concentration and at a temperature of 80 to 95° C.

HARVEY IRVIN STRYKER.